United States Patent [19]

Hoppough et al.

[11] 3,889,073

[45] June 10, 1975

[54] DETECTION OF SERIES-RESONANT CIRCUITS CONNECTED ACROSS TRANSMISSION PATHS

[75] Inventors: Richard Scott Hoppough; Herbert Bryant Walker, all of Greensboro, N.C.

[73] Assignee: Bell Telephone Laboratories, Incorporated, Murray Hill, N.J.

[22] Filed: Mar. 6, 1974

[21] Appl. No.: 448,456

[52] U.S. Cl. .................. 179/175.2 B; 179/175.3 R

[51] Int. Cl. .......................................... H04b 3/46

[58] Field of Search ...... 179/175.2 B, 175.3 R, 175, 179/18 FA

[56] References Cited

UNITED STATES PATENTS

| | | | |
|---|---|---|---|
| 3,515,809 | 6/1970 | Herter | 179/18 FA |
| 3,525,816 | 10/1974 | Herter | 179/18 FA |
| 3,673,356 | 6/1972 | Herter | 179/18 FA |

*Primary Examiner*—Kathleen Claffy
*Assistant Examiner*—Douglas W. Olms
*Attorney, Agent, or Firm*—H. L. Logan

[57] ABSTRACT

A method and apparatus are disclosed for determining if a series-resonant circuit is connected across a transmission path. A series of rectangular waves having a fundamental component at the resonant frequency of the circuit is applied to the path. The presence of the circuit is indicated by the path current exceeding a predetermined level during the midportions of the rectangular waves.

5 Claims, 6 Drawing Figures

DETECTION OF SERIES-RESONANT CIRCUITS CONNECTED ACROSS TRANSMISSION PATHS

BACKGROUND OF THE INVENTION

1. Field of the Invention

The invention relates to the detection of series-resonant circuits connected across transmission paths and, in particular, to the detection at central offices of telephone ringers on telephone lines.

2. Description of the Prior Art

Continuity testing of a telephone line from a telephone central office to a customer may be accomplished by testing the line to determine if a telephone ringer is present. A typical ringer includes a series-connected inductor and capacitor which resonate and appear as approximately 8,000 ohms of impedance in response to a low level (as for example, 10 volts peak-to-peak) 25 Hz sinusoidal voltage. When such ringers are used in a telephone system, tests for a ringer termination may be made by monitoring the line current while a 25 Hz voltage is applied to a line in the same manner as a conventional ringing voltage; that is, between two wire conductors (so-called "tip and ring leads") for a private line service and between one or the other of these conductors and ground for a party line service. (For the purposes of the following discussion, the two-wire and the one-wire-plus-ground ringer paths are referred to generically as "ringer paths.")

In the presence of the 25 Hz test voltage, a ringer path appears essentially as an RC circuit which presents impedances that are both in series and in shunt with either a ringer or an open circuit. For path lengths of eight miles or less, the series impedance is relatively low compared to that of a resonating ringer or open circuit. The shunting (capacitive) impedance, however, is relatively high compared to that of a resonating ringer, but relatively low compared to that of an open circuit. As a consequence, when a path is terminated in a ringer, the path impedance appears to have a value approximating that of the series-resonant impedance of the ringer. On the other hand, when the path has an open circuit, its impedance is equal to the RC impedance of the path. These two conditions are distinguishable from one another through the use of conventional current measuring arrangements.

As a path is increased in length, its shunting capacitance increasingly shunts a resonating ringer or open circuit until a masking effect is produced. The use of such detection circuits for measuring line continuity is therefore limited to lines generally found in metropolitan areas.

SUMMARY OF THE INVENTION

An object of the invention is to detect the presence of series-resonant circuits, such as telephone ringers, at the opposite ends of transmission paths where the lengths of the paths over which detection is to take place is greater than those heretofore possible.

This and other objects are achieved in accordance with the invention by replacing the sinusoidal wave in the above-described procedure with a series of rectangular waves having a fundamental component of the same frequency as the sine wave and, furthermore, sampling the path current during the midportions of each of the rectangular waves. Each rectangular wave functions to rapidly charge the transmission path and thus to remove early in the wave the effect of the path capacitive reactance. The rectangular waves also function to provide a sinusoidal wave component which causes the tuned circuit, if present, to exhibit a resonant impedance characteristic. The rectangular waves further function to provide such a component which makes its greatest contribution to each rectangular wave at the rectangular wave's midpoint, which is at a time subsequent to the path being charged. As a consequence, sampling of the path current during the midportions of the rectangular waves produces path current samples during that portion of the rectangular waves when the effects of path capacitance have been eliminated and when the sinusoidal wave component makes its greatest contribution. Samples thus produced for tuned circuit terminated paths differ from samples thus produced for open-circuit paths. This difference is easily detectable and consequently the two path conditions may be distinguished one from the other.

DESCRIPTION OF THE DISCLOSED EMBODIMENT

Figure 1:
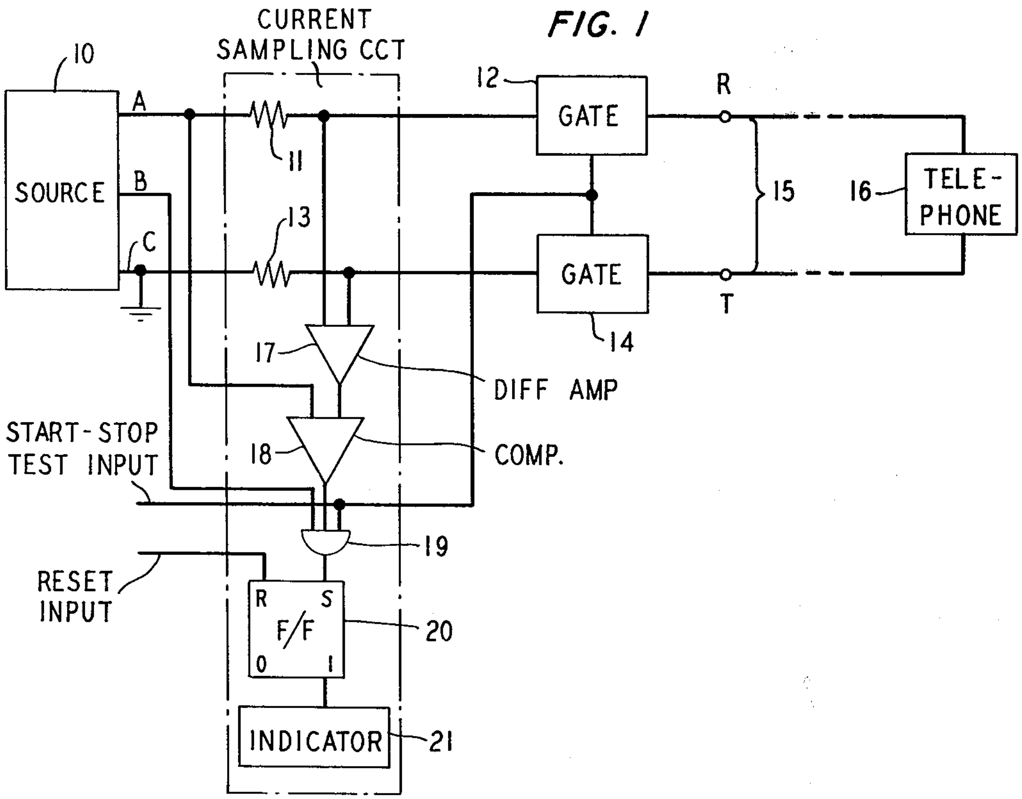
FIG. 1 shows a block diagram of an embodiment of the invention which may be used to detect ringers on private telephone lines.
Figure 2:
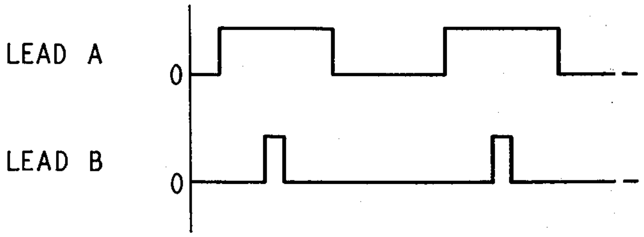
FIG. 2 shows waves produced by a source in the embodiment of FIG. 1.

An embodiment of the invention is shown in FIG. 1. This embodiment includes a low internal-impedance source 10 which has output leads A, B, and C, where C is grounded. The outputs on leads A and B with respect to ground are shown in FIG. 2. The output on lead A is a series of rectangular waves having a repetition rate of 25 Hz that is, the output on lead A comprises rectangular waves which appear at a rate of 25 per second. The output on lead B is a series of pulses having a repetition rate of 25 Hz and phased so as to coincide with substantially the midportions of the rectangular waves on lead A. Although these outputs are shown as positive-going ones, the invention may be practiced, as appreciated by those skilled in the art, by using one or more negative-going outputs.

Source 10 may take any one of a number of forms. One form is disclosed in FIG. 3. In brief, the structure of FIG. 3 includes a 200 Hz rectangular wave source, a three-stage ripple-through counter, an inverter, and an AND gate. The source produces a series, or train, of rectangular waves having a 200 Hz repetition rate; that is source 10 produces rectangular waves at a rate of 200 per second. The counter divides the output of the 200 Hz source to produce the output on lead A; the inverter inverts the output of the 200 Hz source; and the AND gate logically combines the inverted 200 Hz output and various outputs from the counter to produce the output on lead B. Other structures may, of course, be used to produce the outputs on leads A and B.

As shown in FIG. 1, lead A of source 10 is connected through a resistor 11 to a first terminal of a transmission gate 12 while lead C is connected through a resistor 13 to a first terminal of a transmission gate 14. Second terminals of gates 12 and 14 are connected to a ring terminal R and a tip terminal T, respectively. The enabling inputs of gates 12 and 14 are connected to a START-STOP TEST INPUT lead. Transmission gates 12 and 14 permit, when enabled, two-way transmission between their first and second terminals. These gates may take the form of relays.

A private telephone line comprising a pair of wires 15 and a telephone 16 is connected to terminals R and T. The ringer path in this arrangement comprises the pair of wires 15.

As will become apparent from subsequent discussions herein, resistors 11 and 13 are part of a current sampling circuit and are for the purpose of developing potentials related to the currents in the ringer path. As appreciated by those skilled in the art, the actual values required are dependent on the sensitivity of other circuitry in the current sampling circuit. In practice, the values of these resistors are relatively small compared to the resonant impedance of a telephone ringer.

The current sampling circuit comprises resistors 11 and 13, a difference amplifier 17, a comparator 18, an AND gate 19, a flip-flop 20, and an indicator 21. (In accordance with accepted practices for block diagram presentations, ground connections for the blocks in the drawings are not shown.) One input lead to difference amplifier 17 is connected between resistor 11 and gate 12. The potential applied to this lead is therefore the algebraic sum of the voltage drop across resistor 11 and the output on lead A. The other input lead to difference amplifier 17 is connected between resistor 13 and gate 14. The potential applied to this lead is the drop across resistor 13. The output of amplifier 17 is, therefore, related to the algebraic sum of the drops across these two resistors and the output on lead A.

The output of amplifier 17 is influenced by the output on lead A. Compensation is provided by applying the output of amplifier 17 to comparator 18 along with the output on lead A. In response to the output on lead A, comparator 18 produces a reference voltage substantially equal to the portion of the output of amplifier 17 which is attributable to the output on lead A. When the difference between the reference voltage and the output of amplifier 17 exceeds a predetermined level, comparator 18 produces an output which is applied to AND gate 19.

When longitudinal voltages are not induced in wires 15, the same output is produced when either resistor 11 or 13 is replaced by a short circuit and the value of the remaining resistor is doubled. The use of two resistors in the illustrated manner tends to cancel the effect of longitudinally induced voltages. Furthermore, when only resistor 13 is used, the difference amplifier lead now connected between resistor 11 and gate 12 may be connected to lead C. In the latter case, the input to comparator 18, which is now connected to lead A, would be connected to a fixed DC potential.

In addition to receiving the output of comparator 18, AND gate 19 also receives the outputs on lead B and the START-STOP TEST INPUT lead. AND gate 19 produces an output only when all three inputs are present. Such outputs have the duration of the pulses on lead B. The pulse outputs of AND gate 19 are applied to flip-flop 20. The flip-flop functions as a memory device in that a pulse output from AND gate 19 sets the flip-flop and it remains in that state until reset by a signal on the RESET INPUT lead. The output of flip-flop 20 is fed to indicator 21 and causes it to be activated. Such activation indicates good continuity in wires 15.

THEORY OF OPERATION

Figure 4:
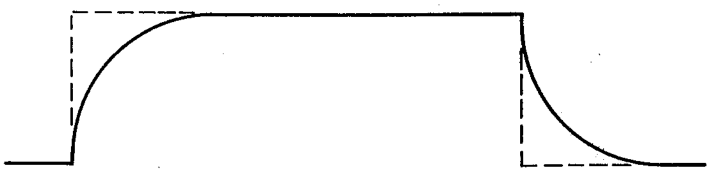
FIGS. 4 and 5 show waves appearing within the embodiment of FIG. 1.
Figure 5:
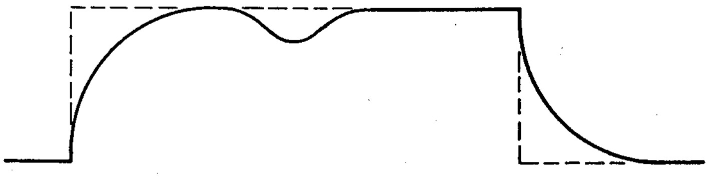

When the private telephone line of FIG. 1 is open circuited, only the RC impedance of wires 15 is seen at terminals R and T. As a consequence, when the output on lead A is applied to terminals R and T by way of resistors 11 and 13 and gates 12 and 14, the leading and trailing edges of the voltage waves between these terminals are exponential in nature while the remainder of the waves conforms to that of the rectangular waves. This is shown in FIG. 4 wherein a single voltage wave between terminals R and T appears in solid line form while a single rectangular wave, which is not covered by the solid line, appears in broken line form. When wires 15 are not open circuited but are terminated by a telephone ringer, the resonant nature of the ringer at 25 Hz causes a decrease in the impedance presented to the fundamental (i.e., the 25 Hz sine wave) component of the voltage across the ringer. This causes the fundamental component of the path current to increase. Because of other impedances (such as resistors 11 and 13) in series with the ringer, the fundamental component of the path current does not increase sufficiently to maintain the amplitude of the fundamental component of the path voltage. These effects are most pronounced at the midpoint of the rectangular voltage wave because it is at that time that the fundamental component makes the greatest percentage contribution to the current and voltage waves. The path voltage produced when a ringer is present is shown in FIG. 5. It should be noted that a depression is produced in the top of the path voltage wave as a result of the resonant nature of the ringer.

Detecting the difference in path currents produced by open-circuited and ringer-terminated paths during the midportions of the output on lead A is the function of the current sampling circuit. During the time of testing a signal is applied to gates 12 and 14 and AND gate 19 by the START-STOP TEST INPUT lead. Lead B also applies pulses to another input of AND gate 19. These pulses correspond in time to the midportions of the rectangular waves on lead A and function to sample any output from comparator 18. The level of the reference voltage developed in comparator 18 is adjusted so that, during sampling times, comparator 18 does not produce outputs for open-circuited paths but does produce outputs for ringer-terminated paths. This is easily accomplished by establishing the two path conditions and then adjusting the reference voltage level while watching the indicator.

From the above discussion, it is believed apparent that: (1) one function of the rectangular waves is to rapidly charge the ringer path; (2) another function of the rectangular waves is to provide a 25 Hz sine wave component which makes its greatest contribution to the rectangular wave at a time subsequent to the path being charged and, furthermore, causes a ringer to exhibit a resonant impedance characteristic; and (3) the function of the current sampling circuit is to sample the path current during that portion of the rectangular wave where the 25 Hz sine wave component makes its greatest contribution.

The exponential leading edges of the waves of FIG. 4 and 5 should be substantially terminated before current sampling occurs. These leading edges are a function of the RC character of the path which in turn is a function of the length of the path. There is, therefore, a limit to the length of path over which the invention may be successfully used. It has been found, however, that the present invention more than doubles the range at which ringers are detectable.

Embodiments of the invention may form a part of equipment designed to perform a series of line tests in a preprogrammed manner. In such equipment, sequencing equipment applies signals to the RESET INPUT and START-STOP TEST INPUT leads. When a ringer is present, flip-flop 18 is set by the conditions produced by the first rectangular wave after a test is started. Very little time is therefore required to perform a ringer detection check. This is an advantage when there are other line tests to be performed.

Extending the Embodiment to Party Line Use

Figure 6:
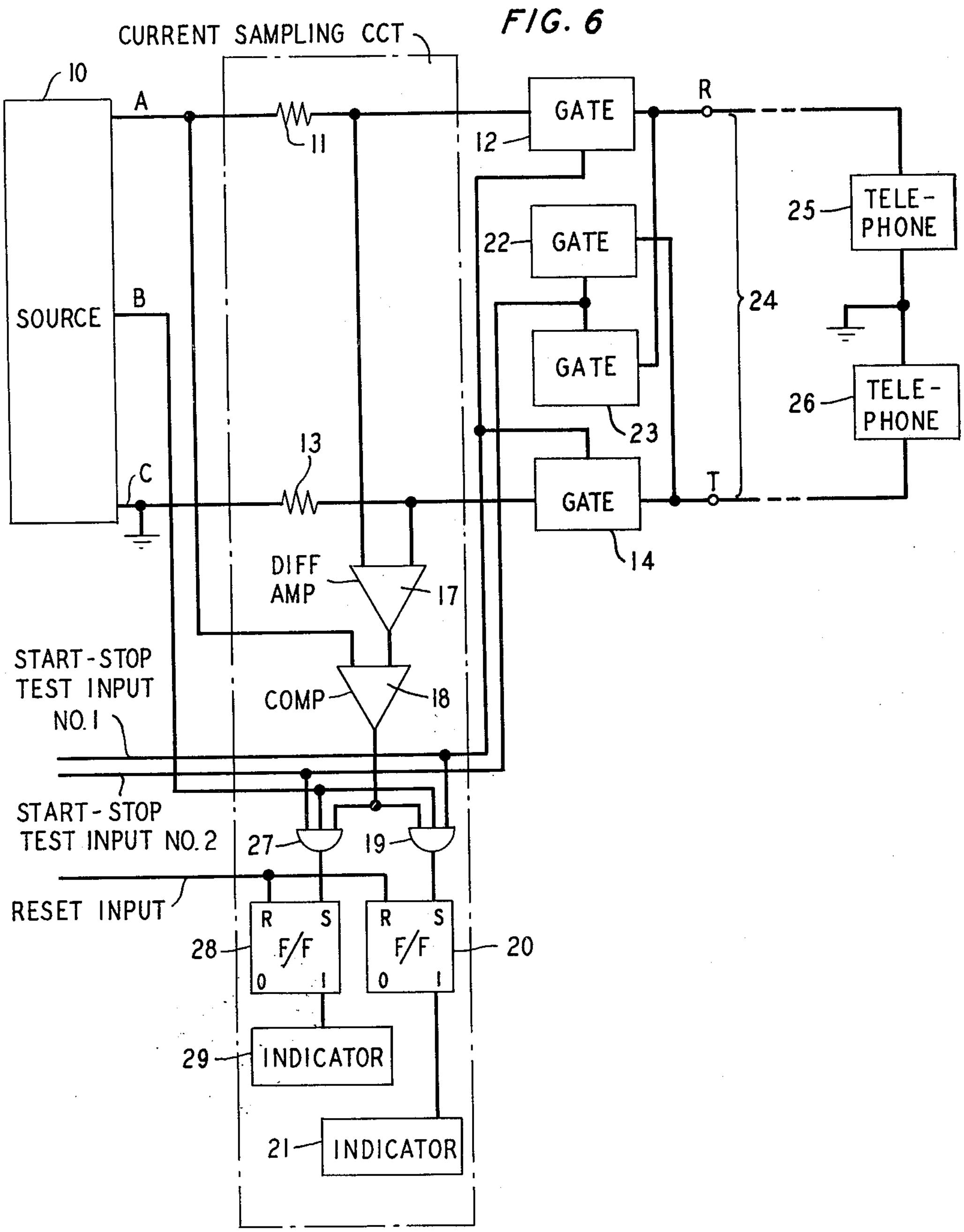
FIG. 6 shows the embodiment of FIG. 1 extended to permit the detection of ringers on party telephone lines in addition to such detection on private lines.

Several components may be added to the embodiment of FIG. 1 to permit testing of two-party telephone lines in addition to testing private lines. This is shown in FIG. 6 wherein components identical to those shown in FIG. 1 have been assigned the same symbol designations. The new components in FIG. 6 include a pair of transmission gates 22 and 23 which are identical to gates 12 and 14. The first terminals of gates 22 and 23 are connected to resistors 11 and 13, respectively, while their second terminals are connected to terminals T and R, respectively. The enabling inputs of these gates are connected to a START-STOP TEST INPUT No. 2 lead (for identification purposes the other START-STOP TEST INPUT lead is identified in FIG. 6 as No. 1). Gates 12 and 14, when enabled, apply the rectangular waves to terminals R and T so that terminal T is essentially at ground potential, whereas gates 22 and 23, when enabled, apply the rectangular waves to terminals R and T in the opposite sense so that terminal R is essentially at ground.

Figure 3:
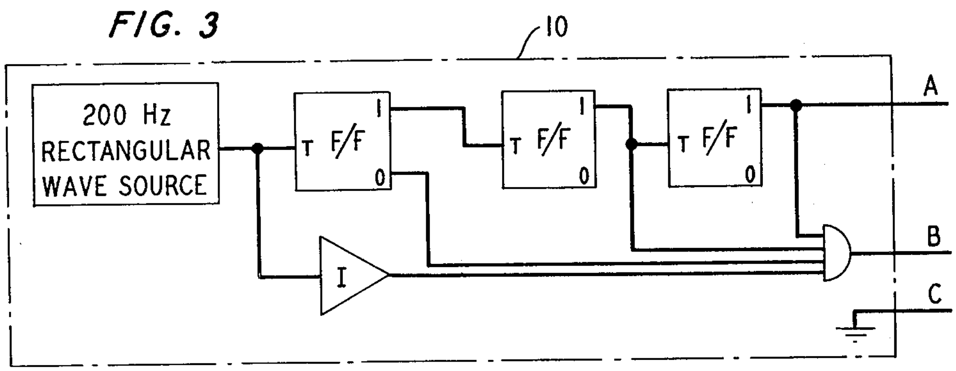
FIG. 3 shows one configuration for the source of the embodiment of FIG. 1.

FIG. 3 shows a two-party telephone line connected to terminals R and T. This line includes a pair of wires 24 and telephones 25 and 26 connected in series between wires 24. The connection between the telephones is connected to ground. In normal use, the ringer in telephone 25 is energized for ringing purposes by grounding terminal T and applying a ringing voltage between terminal R and ground. On the other hand, the ringer in telephone 26 is energized for ringing purposes by grounding terminal R and applying a ringing voltage between terminal T and ground. The wire connected to terminal R plus a ground path therefore comprises the ringer path for telephone 25 while the wire connected to terminal T plus the ground path comprises the ringer path for telephone 26. As is now discussed in detail, the embodiment of FIG. 6 tests these paths to detect the presence of ringers.

With gates 12 and 14 enabled, the output of lead A is applied between terminal R and ground and therefore it is the ringer path to telephone 25 which is being checked. With gates 22 and 23 enabled, the output on lead A is applied between terminal T and ground so that it is the ringer path to telephone 26 which is being checked. Under either condition of enablement, the operation of the embodiment to produce an output from comparator 18 is the same as that presented with respect to the embodiment of FIG. 1.

In order to identify the output of comparator 18 with the ringer path tested, an AND gate 27, a flip-flop 28, an indicator 29 identical to AND gate 19, flip-flop 20, and indicator 21 are provided. AND gate 27 receives inputs from comparator 18, lead B, and START-STOP TEST INPUT No. 2 lead. The output of AND gate 27 sets flip-flop 28 which in turn activates indicator 29. Flip-flop 28 is reset at the same time flip-flop 20 is reset.

In operation, START-STOP TEST INPUT No. 1 lead is energized for several rectangular waves on lead A and then START-STOP TEST INPUT No. 2 lead is energized for several rectangular waves on lead A. When a party line is connected to terminals R and T as shown in FIG. 6, indicator 21 is activated when the ringer in telephone 25 is detected, thus indicating continuity in the wire connected to terminal R. On the other hand, indicator 29 is activated when the ringer in telephone 26 is detected, thus indicating continuity in the wire to terminal T. When a private line is connected to terminals R and T of FIG. 6, both of indicators 21 and 29 are activated when a ringer is detected, thus indicating continuity in both wires going to the subscriber.

What is claimed is:

1. In a test circuit for detecting an impedance connected across a transmission path by connecting a source of voltage across said path and a current monitoring means in said path, an improvement to enable the detection of an impedance in the form of a series-resonant circuit, said improvement comprising, said source producing a series of substantially rectangular waves where said waves have a fundamental component at substantially the same frequency as the resonant frequency of said series-resonant circuit, and said current monitoring means samples said current to produce an output in response to said current exceeding a predetermined level during the midportion of at least one of said rectangular waves.

2. A circuit in accordance with claim 1 in which said sampling current monitoring means comprises, at least one resistor connected in series between said source and said path, first means for comparing the voltage developed across said resistor with a reference voltage and producing an output when the difference between said voltages exceeds a predetermined level, and second means connected to said first means to produce an output in response to the occurrence of said first means output during the midportion of said rectangular waves.

3. A circuit for determining if a series-resonant circuit is connected across a transmission path, said apparatus comprising, a source for producing a series of substantially rectangular waves where said waves have a fundamental component with a frequency substantially equal to the resonant frequency of said series-resonant circuit, means for applying said waves to said path, and a sampling current monitoring means connected to produce an output indication in response to the current in said path exceeding a predetermined level during the midportion of at least one of said rectangular waves.

4. A circuit in accordance with claim 3 in which said sampling current monitoring means comprises, at least one resistor connected in series between said source and said path, first means for comparing the voltage developed across said resistor with a reference voltage and producing an output when the difference between said voltages exceeds a predetermined level, and second means connected to said first means to produce an output in response to the occurrence of said first means output during the midportion of said rectangular waves.

5. A method for detecting a series-resonant circuit connected across a transmission path comprising the steps of applying at least one wave of a series of substantially rectangular waves to said path where the fundamental component of said waves has a frequency substantially equal to that at which said series-resonant circuit resonates, and producing an output indication when the current in said path during the midportion of at least one of said rectangular waves exceeds a predetermined level.

* * * * *